G. A. BLAKE.
AUXILIARY VALVE FOR WATER PIPES, &c.
APPLICATION FILED NOV. 22, 1910.
1,010,220.
Patented Nov. 28, 1911.
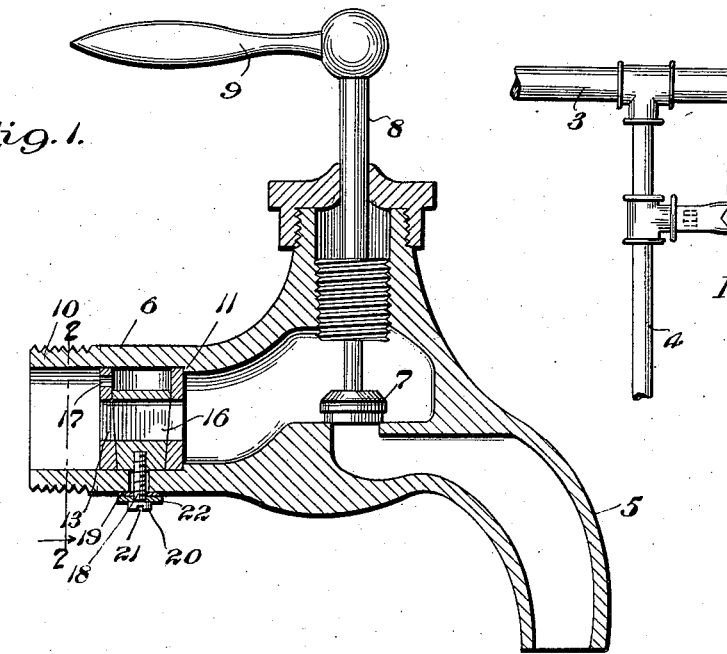
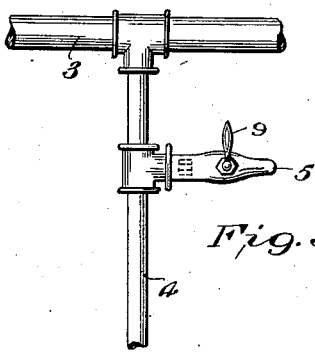
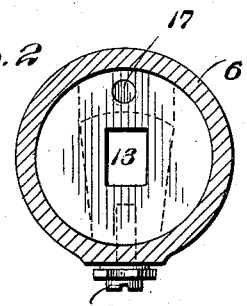
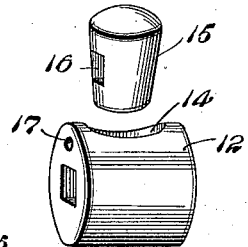
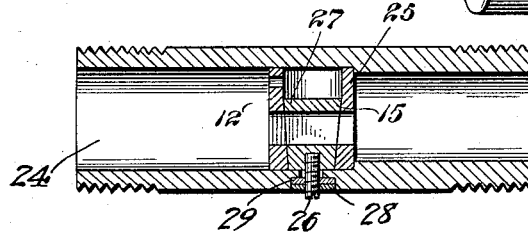
Witnesses
J Adolph Bishop
John Q. Donegay
Inventor
George A. Blake
by Foster Freeman Watson & Co't
Attorneys
COLUMBIA PLANOGRAPH CO., WASHINGTON, D. C.

UNITED STATES PATENT OFFICE.

GEORGE A. BLAKE, OF BOSTON, MASSACHUSETTS.

AUXILIARY VALVE FOR WATER-PIPES, &c.

1,010,220.  Specification of Letters Patent.  Patented Nov. 28, 1911.

Application filed November 22, 1910. Serial No. 593,693.

*To all whom it may concern:*

Be it known that I, GEORGE A. BLAKE, a citizen of the United States, and residing at Boston, in the county of Suffolk and State of Massachusetts, have invented certain new and useful Improvements in Auxiliary Valves for Water-Pipes, &c., of which the following is a specification.

This invention relates broadly to liquid distributing systems, and specifically to devices for controlling the flow of liquid in certain parts of the system.

The primary object of the invention is to equip each faucet controlled service pipe, at a point between the faucet and the supply pipe, with a valve; whereby the flow, of liquid, through the faucet may be varied, or cut off when it becomes necessary to repack the faucet valve.

Another object is the provision of a valve and valve casing to be bodily arranged in the service pipe or inlet end portion of the faucet, so that the general external appearance of the pipe or faucet will remain substantially unaltered.

With these and other objects that will hereinafter appear, the invention will be described in connection with the accompanying drawing, in which,—

Figure 1 is a longitudinal section of an ordinary faucet also showing my device in longitudinal section and applied thereto; Fig. 2 is an enlarged sectional end view taken on the line 2—2 of Fig. 1 and looking in the direction of the arrow; Fig. 3 is a detail perspective of the valve casing also showing the plug in perspective and detached from the casing; Fig. 4 is a longitudinal section of an ordinary coupling sleeve showing my device in longitudinal section and applied thereto; Fig. 5 is a diagrammatic view of a liquid distributing system equipped with my invention.

The faucet illustrated in Fig. 1 comprises a curved outlet end portion 5 and a straight inlet end portion 6. The valve which controls communication between these end portions is designated by the numeral 7, and has the usual stem 8 and handle 9. The inlet end portion 6 of the faucet is connected with the service pipe 4, and the latter connects to the supply pipe 3.

In Figs. 1 to 3 I have shown the device applied to the inlet end portion 6 of the faucet. In this connection the inlet end portion 6 is counter-bored as shown at 10, such counter-bore extending considerably inward, its inner end forming a circular shoulder 11, the function of which will appear later.

The device forming the subject-matter of the present invention comprises a cylindrical casing designated in general by the numeral 12. The diameter of the casing 12 corresponds approximately to the diameter of the counter-bore portion 10 of the faucet, so that when positioned, as shown in Figs. 1 and 2, the casing will fit tightly in the said counter-bore, and bear at one end on the shoulder 11, whereby the casing will be prevented from moving in one direction.

The casing 12 is provided with an axial bore 13 which opens through the opposite ends of the casing. The casing 12 is further provided with a tapered opening 14 arranged at right angles to the bore 13. The opposite ends of the opening 14 extend through opposite portions of the casing, and the medial portion of the opening 14 communicates with the bore 13.

The valve plug 15, as shown on the drawing, is tapered, to conform to the taper of the opening 14, in which it nicely fits. The plug 15 is provided with a transverse port or recess 16 to aline with the bore 13 of the casing, when the plug is turned to the position shown in Figs. 1 and 2.

By reference now to Figs. 1 to 3, inclusive, it will be seen that the length of the plug 15 is somewhat less than the length of the opening 14, so that when the plug is positioned in the casing and the latter arranged in the faucet in the manner before described, the small end of the plug will bear on the inner surface of the end portion 6 whereby a space will be provided between the opposite end of the plug and the adjacent inner surface of the end portion 6, as shown in Figs. 1 and 2. That end of the casing 12 adjacent the outer end of the counter-bore 10 is provided with a duct 17, the said duct 17 extends longitudinally of the casing and communicates with the space above the large end of the plug 15. By the provision of the duct 17 it will be manifest when the plug 12 is turned to a position at right angles to that shown in Fig. 1, that the pressure of the liquid in the space above the large end of the plug will hold the opposite end of the plug in close engagement with the surface upon which it bears.

In Figs. 1 and 2 I have shown a stem removably secured to the small end portion of the plug. The shank 18 of the said stem is screw-threaded and is freely received by an opening 19 formed in the end portion 6. One end portion of the stem is screwed into the plug, and the opposite end portion is provided with a head 20 of greater diameter than the opening 19. The head 20 is provided transversely with a groove 21 to receive the bit of a screw driver when the plug is to be turned. The said head supports a gasket 22, which surrounds the outer end of the opening 19 and prevents the escape of any liquid that may pass between the plug and casing.

In Fig. 4 I have shown the device applied to a well known form of pipe coupling sleeve 23. The sleeve has one end portion counter-bored as shown at 24 to receive the valve casing 25. The operating stem 26 for the plug 27, is in all respects identical to the stem just described. The head of the stem 26 is seated in a counter-bore 28 formed at the outer end of the opening in the sleeve, which opening receives the stem. A suitable gasket 29 bears on the head of the stem 26 and is arranged in the counter-bore 28, so that in the event of liquid leaking to the lower end of the plug 27, the escape of the liquid will be prevented.

From the foregoing it will be seen that when the inner casing is positioned in a faucet or pipe, the element in which it is positioned will serve as an outer casing, whereby the production of a plug valve having an outer and an inner casing is effected.

What I claim and desire to secure by Letters Patent, is:

1. In a liquid distributing system, the combination with a supply pipe and a valve controlled service pipe having an inner shoulder and a lateral opening; of an apertured valve casing of greater diameter than the lateral opening of the service pipe and wholly arranged in the service pipe at a point between the valve thereof and the supply pipe and bearing on the shoulder, an apertured valve plug located in the casing, and an operating handle connected to the plug and extending through said lateral opening.

2. A plug valve including an outer casing having a lateral opening, an inner casing of greater diameter than the lateral opening and provided with inlet and outlet ports, a plug having a passage therethrough and movable in said inner casing, and means extending through the lateral opening for turning said plug.

3. In a valve, the combination of an outer casing, an apertured plug of less length than the diameter of the bore of the outer casing, a bearing at one end of the plug on the inner surface of the outer casing, an apertured inner casing having an exterior dimension corresponding approximately with the diameter of said bore and surrounding the plug and having a duct for establishing communication between the passage of the outer casing and space beyond the opposite end of said plug, and means for turning said plug.

4. In combination, a liquid conducting member having a lateral opening and interiorly provided with a shoulder, a valve casing of greater diameter than the said lateral opening and wholly arranged in said member and bearing on the shoulder, an apertured valve plug arranged in the casing, and means extending through said lateral opening for turning the plug.

5. In combination, a liquid conducting member, an apertured casing located in said member and having an opening therethrough at right angles to the long axis of the member, said member being further provided with a duct communicating at one end with the said opening, a movable valve plug having an opening therethrough and located in the opening in the casing, and of less length than the casing, said valve plug bearing at one end on the conducting pipe and the opposite end of said plug lying adjacent to said duct.

6. In a device of the class described, a conducting member having a cylindrical bore and a lateral opening therein, a cylindrical valve casing arranged in said bore adjacent said lateral opening and provided with inlet and outlet openings, and a plug valve in said casing having a passage adapted to connect said inlet and outlet openings, and said casing being provided with a chamber at one end of said valve, and means connecting said chamber with the interior of said conducting member.

In testimony whereof I affix my signature in presence of two witnesses.

GEORGE A. BLAKE.

Witnesses:
 ROBERT C. REDDING,
 FRANK E. DREW.

Copies of this patent may be obtained for five cents each, by addressing the "Commissioner of Patents, Washington, D. C."